(12) United States Patent
Nakamura et al.

(10) Patent No.: US 6,515,700 B2
(45) Date of Patent: *Feb. 4, 2003

(54) PICTURE SIGNAL PROCESSING APPARATUS, COLOR VIDEO CAMERA AND PICTURE SIGNAL PROCESSING METHOD

(75) Inventors: Hitoshi Nakamura, Kanagawa (JP); Seiji Kawa, Kanagawa (JP); Fumihiko Sudo, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/225,791

(22) Filed: Jan. 5, 1999

(65) Prior Publication Data

US 2001/0048476 A1 Dec. 6, 2001

Related U.S. Application Data

(63) Continuation of application No. PCT/JP98/02035, filed on May 7, 1998.

(30) Foreign Application Priority Data

May 7, 1997 (JP) .............................. 9-117191

(51) Int. Cl.$^7$ ................................. H04N 9/64
(52) U.S. Cl. ...................... 348/256; 348/645
(58) Field of Search ............... 348/645, 649, 348/646, 674, 256, 254

(56) References Cited

U.S. PATENT DOCUMENTS 5,357,279 A * 10/1994 Nakamura et al. .......... 348/207
5,555,031 A * 9/1996 Van Rooij ................ 348/645
5,949,482 A * 9/1999 Kawa ..................... 348/265
6,111,607 A 8/2000 Kameyama

FOREIGN PATENT DOCUMENTS

| JP | 63-59292 | 3/1988 | ............ H04N/9/68 |
| JP | 5-76036 | 3/1993 | ............ H04N/9/69 |
| JP | 6-276542 | 9/1994 | ............ H04N/9/69 |
| JP | 6-319149 | 11/1994 | ............ H04N/9/64 |
| JP | 7-177530 | 7/1995 | ............ H04N/9/68 |
| JP | 7-231453 | 8/1995 | ............ H04N/9/45 |
| JP | 7-288837 | 10/1995 | ............ H04N/9/68 |
| JP | 8-88863 | 4/1996 | ............ H04N/9/69 |

* cited by examiner

*Primary Examiner*—Aung S. Moe
(74) *Attorney, Agent, or Firm*—Frommer Lawrence & Haug LLP; Willliam S. Frommer; Dennis M. Smid

(57) ABSTRACT

Of three-color signals R', G' and B', obtained as output signals of multipliers 156R, 156G and 156B, designed to effectuate luminance compression of the three-color signals R, G and B sent to input terminals 151R, 151G and 151B by multiplying the signals R, G and B with a coefficient k, in such a manner as to maintain saturation and color hue of the three-color signals R, G and B, only the saturation of color video signals represented by the three-color signals R', G' and B' is compressed by first saturation compression circuits 160R, 160G and 160B so that the signal level of the signal of the three-color signals R', G' and B' having the highest signal level will be the clip level. Of the three prime color signals R", G" and B" obtained as output signals of the first saturation compression circuits 160R, 160G and 160B, only the saturation of the signals R", G" and B" is compressed, in a state in which the luminance and the color hue of the signals R", G" and B" are maintained, in order to obtain three prime color signals R*, G* and B* the high luminance portion of which has only saturation changed.

21 Claims, 13 Drawing Sheets

PICTURE SIGNAL PROCESSING APPARATUS, COLOR VIDEO CAMERA AND PICTURE SIGNAL PROCESSING METHOD

This is a continuation of copending International Application PCT/JP98/02035 having an international filing date of May 7, 1998.

TECHNICAL FIELD

This invention relates to a picture signal processing apparatus for level compressing high-luminance portions of picture signals, a color video camera carrying the apparatus and a picture signal processing method.

BACKGROUND ART

In picture signal standards of standard television systems, such as National Television System Committee (NTSC) or Phase Alternation by Line (PAL) systems, the black level and the maximum white level of luminance signals are fixed, such that a portion brighter than the maximum white level cannot be displayed. Thus, in video cameras, luminance compression is used in order for the high luminance portion to be accommodated in picture signals. That is, with the white level in the picture signal standard of 100%, the maximum white level is 105 to 110%, so that image pickup signals of the luminance signal level of 95 to 200% obtained from an imager are compressed in level so that the imaged signals with the luminance signal level of 90 to 200% obtained from the imager will be accommodated in the luminance signal level of from 95 to 110%.

An illustrative inner structure of a video camera 9 handling monochomatic picture signals is shown in FIG. 1.

The video camera 9 shown in FIG. 1 includes a CCD image sensor 2 on which falls an imaging light beam from an object via an imaging lens 1. The CCD image sensor 2 images an object image formed by the imaging light for conversion to electrical signals. The electrical signals obtained by the CCD 2, that is the imaging signals, are processed by a contour enhancement circuit 3 with contour enhancement in both the horizontal and vertical directions. The electrical signals are also processed by a luminance compression circuit 4 with luminance compression.

An output signal of the luminance compression circuit 4 is processed by a gamma correction circuit 5 with non-linear correction known as gamma correction and is further processed by a white clipping circuit 6 with white clipping for prohibiting outputting of a signal higher in luminance signal level than the video signal standard. The resulting signal then is amplified by an amplifier 7 so as to be used as an output video signal of the video camera 9.

If the signal level of a luminance signal Y prior compression by the luminance compression circuit 4 is y, the signal level of the luminance signal after compression is y' and a signal Y for which the signal level y exceeds the signal level Kp is compressed with a compression ratio Ks, the luminance compression by the luminance compression circuit 4 is given by the following equations:

$y'=y$, if $y \leq Kp$ $y'=Ks(y-Kp)+Kp$, if $y>Kp$.

For example, if the 100% white level in the above image signal standard is 1, the luminance signal Y prior to compression, having the luminance signal level up to 200% (=2) is suppressed to the luminance signal level of 110% (=1.1), and the signal of Kp is 95% (=0.95), $Ks=(1.1-0.95)/(2-0.95)$ such that $y'=y$, if $y \leq 0.95$ and $y'=\{(1.1-0.95)/(2-0.95)\} \times (y-0.95)+0.95$, if $y>0.95$.

This luminance compression can be represented by a graph of FIG. 2. If the white level in the image signal standard is 100%, the abscissa and the ordinate in FIG. 2 represent the signal level of the luminance signal Y prior to compression, that is the input signal, in percentage (%), while the ordinate in FIG. 2 represents the signal level of the luminance signal Y after compression, that is the output signal, similarly in percentage The above-described luminance compression system is herein termed the first system.

Although FIG. 1 shows the structure of the video camera 9 handling monochromatic signals, as an example, the inner structure of the color video camera handling color image signals, shown for example, in FIG. 3, is known.

As differences between the structure of a color video camera 10 shown in FIG. 3 and that of the video camera 9 shown in FIG. 1, a color separation prism 12 for separating the imaging light for forming an image of an object into color components of three prime colors of red, green and blue is arranged at back of an imaging lens 11, while there are provided CCD image sensors 13R, 13G and 13B for imaging each object image separated into respective color components, amplifiers 14G, 14R and 14B for taking white balance of red, green and blue signals R, G and B obtained as imaging signals of respective colors by the CCD image sensors 13R, 13G and 13B, contour enhancement circuits 15R, 15G and 15B for executing contour enhancement or luminance compression for three channels, luminance compression circuits 16R, 16G and 16B, gamma correction circuits 17R, 17G and 17B and while clip circuits 18R, 18G and 18B. In addition, there is added an encoder 19 for converting three prime colors R, G and B to color image signals of, for example, NTSC or PAL.

That is, in the color video camera 10 shown in FIG. 3, the imaging light from an object, incident via an objective lens 11, is separated by a color separation prism 12 into three prime colors of red, green and blue. The light of the respective color components falls on the associated CCD image sensors 13R, 13G and 13B so as to be thereby converted into imaging signals associated with the light of the respective color components, that is into three prime color signals R, G and B.

These three prime color signals R, G and B from the CCD image sensors 13R, 13G and 13B are adjusted in signal levels by associated amplifiers 14G, 14R and 14B in order to achieve the white balance. The resulting signals are sent to associated respective contour enhancement circuits 15R, 15G and 15B for contour enhancement. Output signals of the luminance compression circuits 16R, 16G and 16B are gamma-corrected by the respective gamma correction circuits 17R, 17G and 17B and white-clipped by the associated while clip circuits 18R, 18G and 18B so as to be thence supplied to an encoder 19. The encoder 19 generates color video signals pursuant to the standard television system, such as NTSC or PAL. These color video signals are sent to an amplifier 20. The color video signals, amplified by the amplifier, serve as output video signals of the color video camera 10.

It is noted that luminance compression by the color video camera 10 shown in FIG. 3 is performed by the above-mentioned first system independently for each of the three prime color signals R, G and B. The system for independently luminance-compressing the three prime color signals R, G and B by the above-mentioned first system is herein termed a second system.

However, with this second system, there is raised a problem that the color hue or saturation is changed in high luminance portions obtained on imaging a colored object.

Thus, the present Assignee proposed in Japanese patent application no. H-8-91575, which corresponds to WO98/51089 and U.S. Pat. No. 6,111,607, a level compressing method for color video signals in which luminance signals Y are generated from the three prime color signals R, G and B to perform luminance compression on the basis of the luminance signals Y instead of compressing the three prime color signals R, G and B by independent luminance compressing circuit.

In this level compressing method for color video signals, disclosed in Japanese Patent Application No. H-8-91575, the three prime color signals R, G and B are compressed in luminance using a luminance compressing circuit 150 shown for example in FIG. 4.

In the luminance compressing circuit 50, the three prime color signals R, G and B entering input terminals 51R, 51G and 51B are sent to associated multipliers 56R, 56G and 56B, respectively, while being also sent to a Y-matrix circuit 52.

The Y matrix circuit 52 generates luminance signals Y from the supplied three prime color signals R, G and B. The luminance signals Y generated by the Y-matrix circuit 52 are sent to a high luminance compression circuit 54.

The high luminance compression circuit 54 compresses high luminance portions of the luminance signals Y by the above-described first system in accordance with the above-mentioned first system, using coefficients for Kp and Ks, sent from a terminal 53.

The luminance signals Y', outputted by the high luminance compression circuit 54, are sent to a divider 55 which then divides the luminance signals Y' from the high luminance compression circuit 54 with the luminance signals Y from the Y-matrix circuit 52 to find a coefficient k.

The coefficient k found by the divider 55 is sent to the multipliers 56R, 56G and 56B fed with the above-mentioned three prime color signals R, G and B. These multipliers 56R, 56G and 56B multiply the three prime color signals R, G and B with the coefficient k in order to perform luminance compression for maintaining saturation and color hue.

Three prime color signals R', G' and B', obtained as output signals of the multipliers 56R, 56G and 56B, are sent to associated saturation compression circuits 60R, 60G and 60B, respectively, while also being sent to a maximum value detection circuit 57.

The maximum value detection circuit 57 detects the maximum one of the three prime color signals R', G' and B', obtained as output signals of the multipliers 56R, 56G and 56B, as namY'.

This maximum value namY' is sent to a coefficient processor 59 fed with the luminance signals Y' from the high luminance compression circuit 54 and with a setting coefficient $Wc^{-\gamma}$ specifying the white clip level from a terminal 81. Using these signals, the coefficient processor 59 finds a coefficient k' by processing:

$$k' = (Wc^{-\gamma} - Y')/(namY' - Y')'.$$

The coefficient k', found by the coefficient processor 59, is sent to the above-mentioned saturation compression circuits 60R, 60G and 60B which is fed not only with the three prime color signals R', G' and B', as output signals of the multipliers 56R, 56G and 56B, but also with the luminance signals Y' from the high luminance compression circuit 54. Using these signals, the saturation compression circuits 60R, 60G and 60B effectuate saturation compression under a constant state of luminance and color hue.

The three prime color signals R", G" and B", obtained as output signals of the saturation compression circuits 60R, 60G and 60B, are outputted at associated terminals 61R, 61G and 61b as output signals of the luminance compression circuit.

If, in the color video camera, having the luminance compression circuit 50 for luminance compression as described above, the lens stop is opened as an object of a given color is imaged, there is no change in the three prime color signals R', G' and B' obtained as output signals of the multipliers 56R, 56G and 56B, until the maximum value namY', detected by the maximum vale detection circuit 57, exceeds the white clip level as indicated by setting coefficient $Wc^{-\gamma}$ as set by the coefficient processor 59. If the maximum value namY' exceeds the white lip level, chromaticity is lowered as the luminance and the color hue are maintained, with the saturation becoming equal to zero when the luminance signals Y' reaches the white clip level. FIG. 5 shows an example of a signal entering the luminance compressing circuit 50. The maximum value namY' in this case is equal to the green color signals. In FIG. 5, the abscissa and the ordinate dente the amount of opening of the lens iris, usually provided in an imaging lens of the video camera, and an output signal level, respectively.

The above-described system of effectuating luminance compression based on the luminance signals Y generated from the three prime color signals R, G and B is herein termed the third system.

DISCLOSURE OF THE INVENTION

In the above-described third system, the saturation is not compressed whatsoever until the maximum value namY' reaches the white clip level, so that significant saturation of the prime color is directly reproduced thus being obtrusive to the viewer. That is, with the present third system, the color of the high luminance portion is excessively outstanding. This is particularly manifest if an object the color of which is predominantly the prime color is imaged.

It is not possible with the second system nor with the third system to change only the saturation of the high luminance portion according to liking, as discussed above.

In view of the above-described status of the art, it is an object of the present invention to provide an image signal processing apparatus whereby only the saturation of the high luminance portion is changed according to the liking, in order to assure more spontaneous luminance compression, and a color video camera having the image signal processing apparatus loaded thereon.

It is another object of the present invention to provide a picture signal processing method whereby only the saturation of the high luminance portion is changed according to the liking, in order to assure more spontaneous luminance compression.

According to the present invention, the above object is accomplished by compressing only the saturation of color image signals represented by three prime color signals so that, in a state in which the color hue and luminance of the color picture signals are maintained, the signal level of the signal of the three prime color signals having the highest signal level will be a first signal level, and by compressing only saturation in a state in which luminance and chromaticity are maintained.

In one aspect, the present invention provides a picture signal processing apparatus including first saturation compression means for compressing only saturation of color image signals represented by three prime color signals so that, in a state in which the color hue and luminance of the color picture signals are maintained, the signal level of the signal of the three prime color signals having the highest signal level will be a first signal level, and second saturation compression means for compressing only the saturation of the color picture signals, compressed in saturation by the first saturation compression means, in a state in which the luminance and the color hue are maintained.

In another aspect, the present invention provides a color video camera including image pickup means for generating three-color signals in meeting with imaging light, first saturation compression means for compressing only saturation of color video signals represented by the three-color signals generated by the image pickup means so that, in a state in which the color hue and saturation of the color video signals are maintained, the maximum signal level of three-color signals will be a first signal level, and second saturation compression means for compressing only saturation of the color video signals, at least compressed in saturation by the first saturation compression means, in a state in which luminance and the color hue of the color video signals are maintained.

In the video signal processing apparatus and the color video camera according to the present invention, luminance compression means may be provided ahead of the first saturation compression means. The signal levels of the input three-color signals may be compressed in signal level with the same compression ratio, in a state in which the color hue and saturation of the color video signals represented by the input three-color signals are maintained so that finally only the saturation of the color video signals will be compressed by the first and second saturation compression means.

Preferably, first and second saturation compression means effectuate saturation compression based on the luminance signal level of color video signals outputted by the luminance compression means. The range of compression of saturation by the second saturation compression means can be variably set by control means.

In yet another aspect, the present invention provides a method for processing picture signals including a first saturation compression step of compressing only saturation of color image signals represented by three prime color signals so that, in a state in which the color hue and luminance of the color picture signals are maintained, the signal level of the signal of the three prime color signals having the highest signal level will be a first signal level, and a second saturation compression step of compressing only saturation of the color picture signals, compressed in saturation by the first saturation compression step, in a state in which the luminance and the color hue are maintained.

In the picture signal processing method of the present invention, it is possible to provide a luminance compression step ahead of the first saturation compression step. By this luminance compression step, the signal levels of the input three-color signals are compressed with the same compression ratio for the input three-color signals, in a state in which the color hue and saturation of the color video signals represented by the input three-color signals are maintained, before executing the first and second saturation compression steps.

BEST MODE FOR CARRYING OUT THE INVENTION

Figure 1:
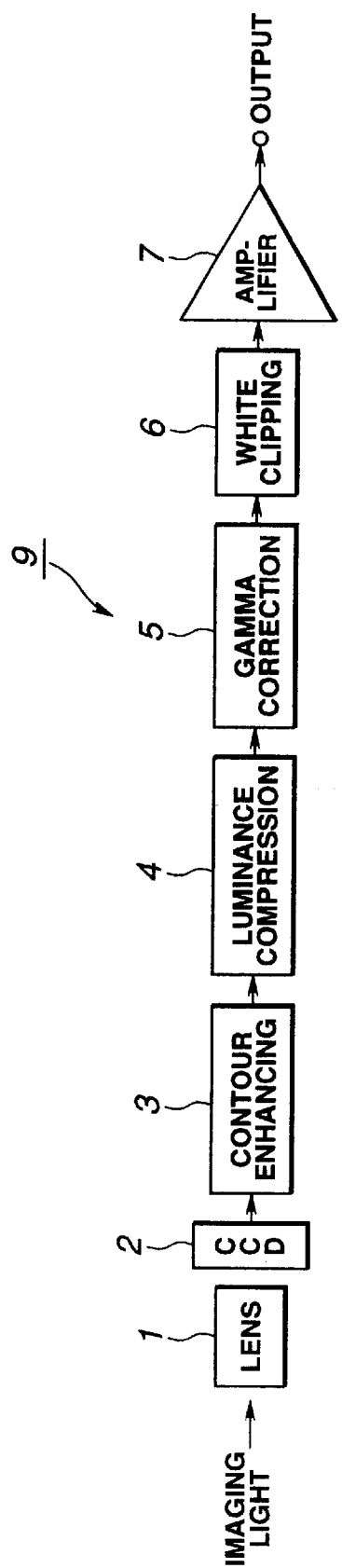
FIG. 1 is a schematic block circuit diagram showing the structure of a conventional monochomatic video camera.
Figure 2:
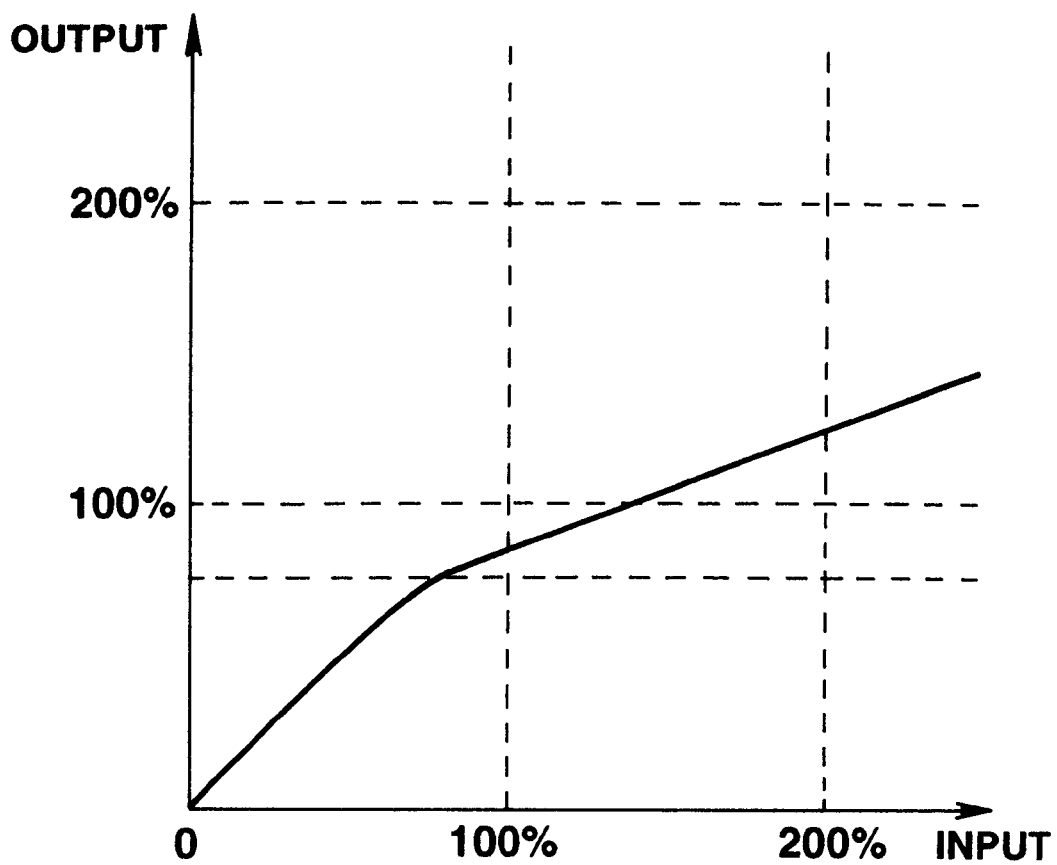
FIG. 2 illustrates the state of luminance compression by aluminance compression circuit provided in the conventional video camera.
Figure 3:
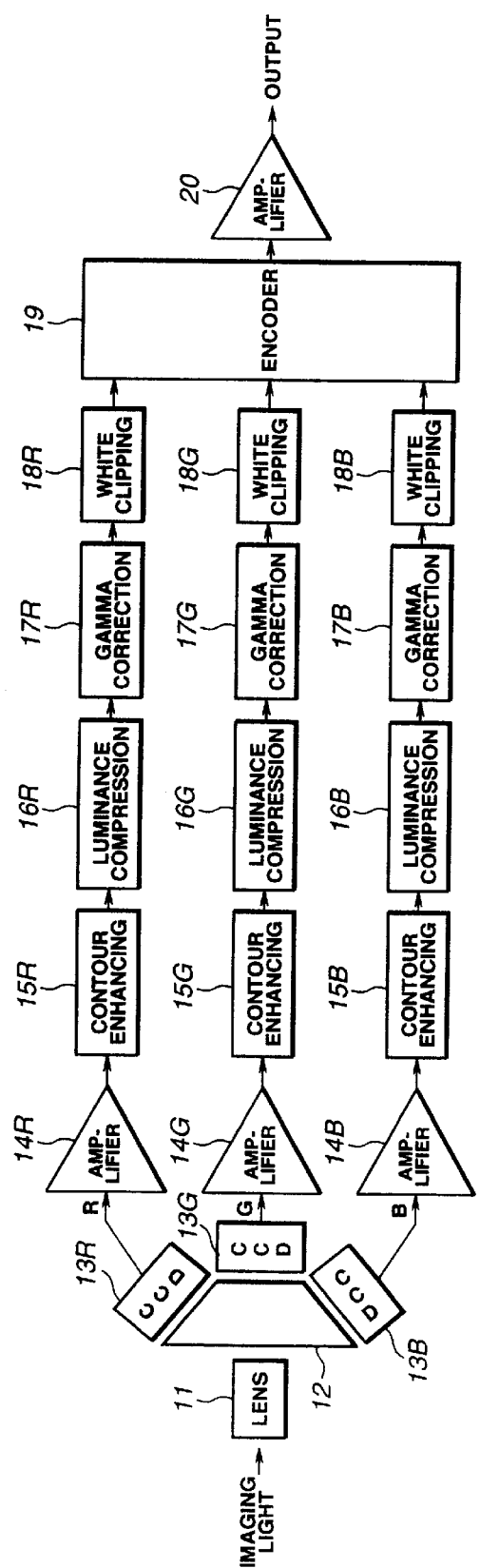
FIG. 3 is a schematic block circuit diagram showing the structure of the conventional color video camera.
Figure 4:
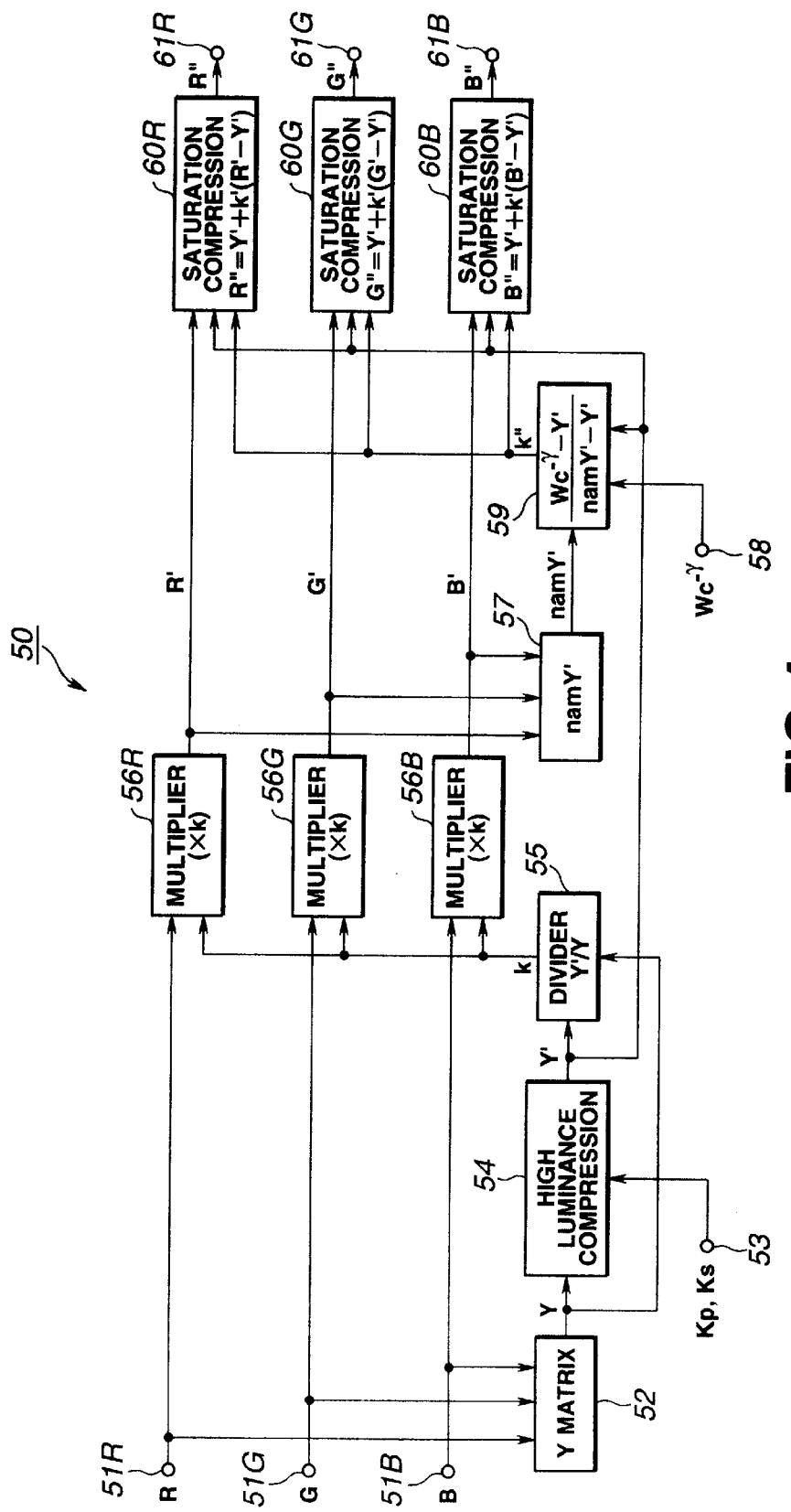
FIG. 4 is a schematic block circuit diagram showing the structure of a luminance compression circuit relevant to the present invention.
Figure 5:
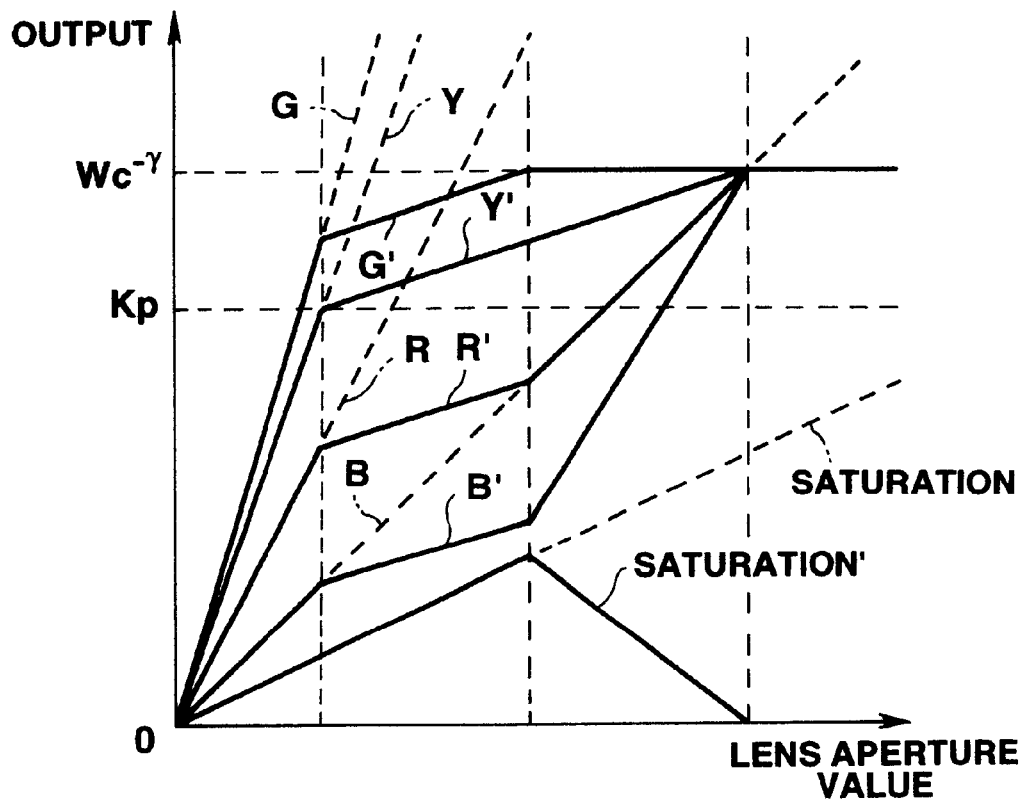
FIG. 5 illustrates the state of luminance compression in the luminance compression circuit shown in FIG. 4.

Referring to the drawings, preferred embodiments of the present invention will be explained in detail.

Figure 6:
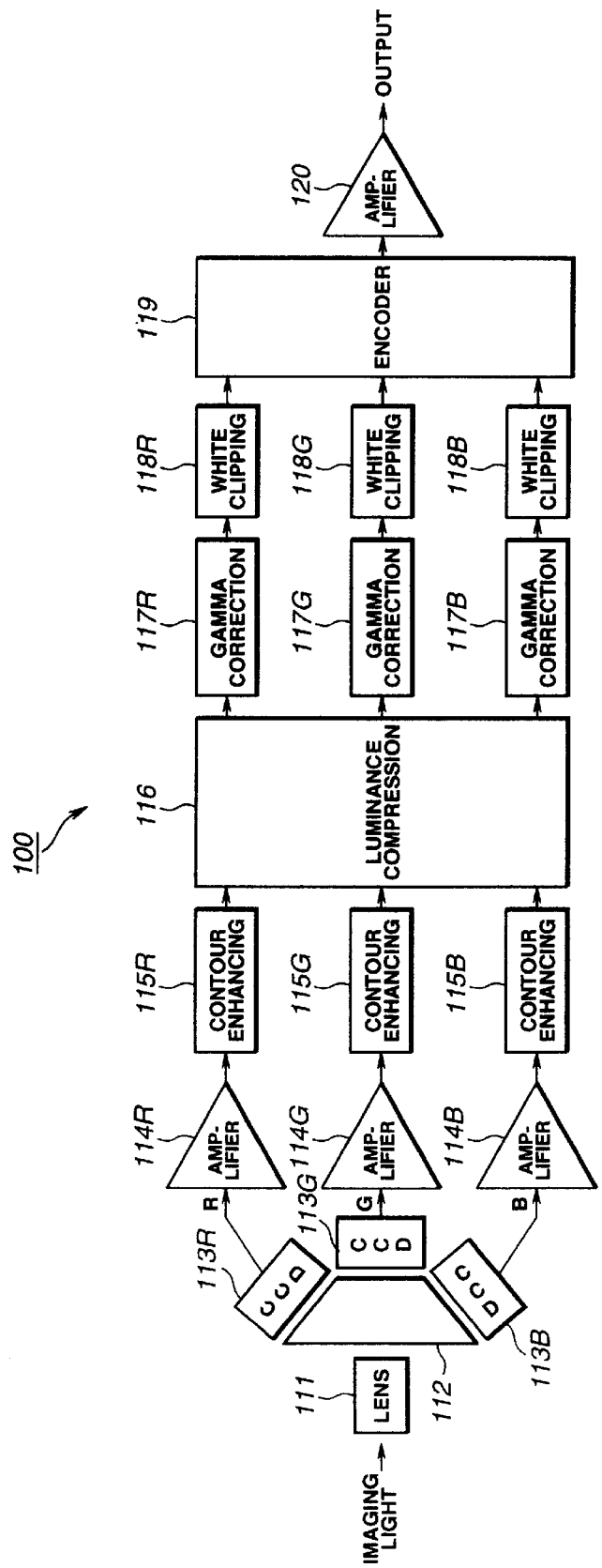
FIG. 6 is a schematic block circuit diagram showing the structure of a color video camera according to the present invention.

The present invention is applied to a color video camera configured as shown in FIG. 6.

A color video camera 100, shown in FIG. 6, includes a color separation prism 112 for separating the imaging light entered via an imaging lens 111 into color components of the three prime color signals R, G and B. The color video camera 100 picks up an object image, separated by the color separation prism 112, into respective color components, by CCD image sensors 113R, 113G and 113B.

With the present color video camera 100, the three prime color signals R, G and B, the three prime color signals R, G and B, obtained as image pickup signals of the respective color components by the CCD image sensors 113R, 113G and 113B, are sent via amplifiers 114R, 114G and 114B to contour enhancement circuits 115R, 115G and 115B, respectively, and output signals of the contour enhancement circuits 115R, 115G and 115B are sent via aluminance compression circuit 116 to gamma correction circuits 117R, 117G and 117B, output signals of which are sent via while clip circuits 118R, 118G and 118B to an encoder 119. An output of the encoder 119 is amplified by an amplifier 110 so as to be outputted as an output video signal of the color video camera 100.

Specifically, with the present color video camera 100, an image pickup light form an object, incident on the imaging lens 111, is separated by the color separation prism 112 into three prime color signals R, G and B. The light rays of the respective color components are incident on the associated CCD image sensors 113R, 113G and 113B and are thereby converted to imaging signals associated with the respective color components, that is three prime color signals R, G and B.

The three prime color signals R, G and B, obtained as image pickup signals, are adjusted for white balance by associated amplifiers 114G, 114R and 114B, and are enhanced in contour by the associated contour enhancement circuits 115R, 115G and 115B. Output signals of these contour enhancement circuits 115R, 115G and 115B are sent to a luminance compression circuit 116.

The three prime color signals R, G and B, compressed in luminance by the luminance compression circuit 116, are gamma-corrected by the associated gamma correction circuits 117R, 117G and 117B and white-clipped by the associated while clip circuits 118R, 118G and 118B so as to be thence supplied to the encoder 119. The encoder 119 generates coor video signals conforming to the standard television system, such as NTSC or PAL, from the three prime color signals R, G and B, in order to send the generated coorvideo signals to an amplifier 120. The color video signals amplified by the amplifier 120 serve as output video signals of the color video camera 100.

Figure 7:
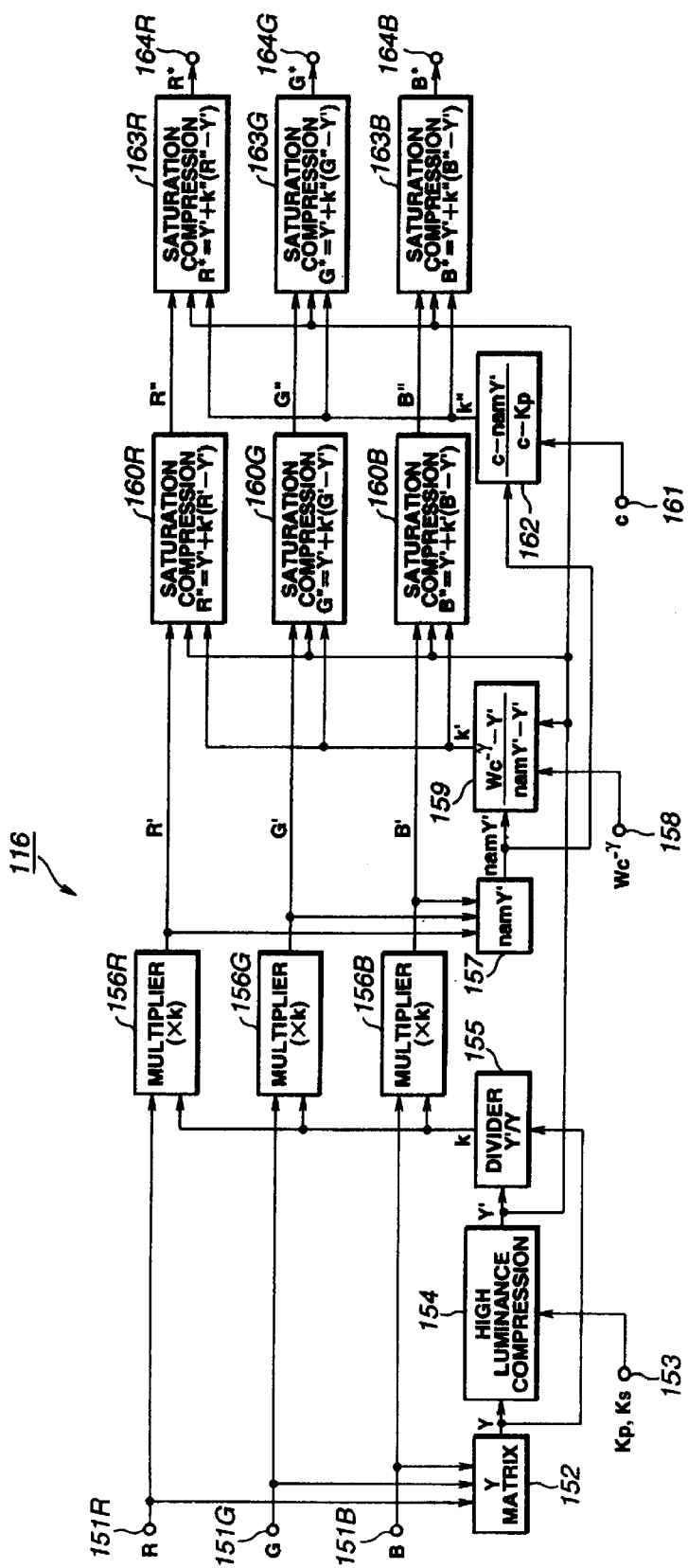
FIG. 7 is a schematic block circuit diagram showing the structure of a luminance compression circuit provided in the color video camera shown in FIG. 6.

FIG. 7 shows a specified illustrative structure of the luminance compression circuit 116 of the color video camera 100.

In the luminance compression circuit 116 shown in FIG. 7, three prime color signals R, G and B, obtained as output signals from the contour enhancement circuits 115R, 115G and 115B, are sent to input terminals 151R, 151G and 151B. These three prime color signals R, G and B are sent to associated multipliers 156R, 156G and 156B and to a Y-matrix circuit 152.

From the supplied three prime color signals R, G and B, the Y-matrix circuit 152 executes processing of $$Y=rR+gG+bB$$

to generate luminance signals Y. It is noted that r+g+b=1 and, incase of the standard television system, such as NTSC or Pal system, r=0.3, g=0.59 and b=0.11.

The luminance signals Y generated by the Y-matrix circuit 152 is sent to a high luminance compression circuit 154 which then compresses the high luminance portion of the luminance signals Y in accordance with the above-mentioned first system. That is, if the signal level of the luminance signals Y prior to high luminance compression is y and the signal level of the post-compression luminance signals Y' is y', with the luminance signals Y with the signal level y exceeding the signal level Kp being compressed in level with a compression ratio Ks, the high luminance compression circuit 154 uses the coefficients for Kp and Ks supplied from a terminal 153 to set y'=y or y'=Ks(y−Kp)+Kp for y≦Kp or y>Kp, respectively.

An output signal of the high luminance compression circuit 154, that is luminance signal Y', is sent to a divider 155. The divider 155 uses the pre-compression luminance signals Y from the Y-matrix circuit 152 and the post-compression luminance signals Y' from the high luminance compression circuit 154 to make division of k=Y'/Y in order to find the first coefficient k.

The first coefficient k, as found by the divider 155, is sent to the multipliers 156R, 156G and 156B fed with the three prime color signals R, G and B. The multipliers 156R, 156G and 156B use the three prime color signals R, G and B supplied thereto and the above-mentioned first coefficient k to execute multiplication of R'=kR, G'=kG and B'=kB, in order to execute luminance compression such as to maintain the saturation and the color hue.

The signals R', G' and B' denote three prime color signals obtained after luminance compression by multiplication of the three prime color signals R, G and B by the first coefficient k such as to maintain saturation and color hue.

Since there is no change in the signal level ratio of the above three prime color signals R, G and B and the three prime color signals R', G' and B' after luminance compression which maintain saturation and color hue, the coor hue and saturation are kept while compression is applied only to luminance. It is noted that more detailed description of the luminance compression which maintain the saturation and the color hue will be made subsequently.

Meanwhile, this luminance compression circuit 116 executes chromaticity compression of maintaining luminance and the color hue in a state in which the color hue is not changed by white clipping in the while clip circuits 118R, 118G and 118B provided on the downstream side.

For executing the above-mentioned chromaticity compression of maintaining luminance and the color hue, the three prime color signals R', G' and B', outputted by the multipliers 156R, 156G and 156B, are sent to associated first saturation compression circuits 160R, 160G and 160B and to a maximum value detection circuit 157 comprised of a non-additive mixer (NAM) circuit.

The maximum value detection circuit 157 detects the maximum one of the three prime color signals R', G' and B' as namY'.

This maximum value namY' is sent to a second coefficient processor 159. The second coefficient processor 159 is also fed with a luminance signal Y' from the high luminance compression circuit 154 and a setting coefficient Wc$^{-\gamma}$ specifying the white clip level from a terminal 158. This setting coefficient becomes the white clip level on gamma correction, Using these, the second coefficient processor 159 executes processing of $$k'=(Wc^{-\gamma})/(namY'-Y')$$

where k'=1 for namY'≦Wc$^{-\gamma}$ and k'=0 for Y'≦Wc$^{-\gamma}$, with 0≦k'≦1
in order to find a second coefficient k'.

The second coefficient k', as found by the second coefficient processor 159, is sent to the first saturation compression circuits 160R, 160G and 160B fed with the three prime color signals R', G' and B'. These first saturation compression circuits 160R, 160G and 160B are also fed with the luminance signals Y' from the high luminance compression circuit 154. Using these signals, the first saturation compression circuits 160R, 160G and 160B execute chromaticity compression of maintaining the luminance and the color hue by $$R''=Y'+k'(R'-Y')$$

$$G''=Y'+k'(G'-Y')$$

$$B''=Y'+k'(B'-Y')$$

where R", G" and B" denote three prime color signals after the chromaticity compression of maintaining the luminance and the color hue.

In the chromaticity compression of maintaining the luminance and the color hue, saturation compression is executed so that the maximum value namY' will not exceed the setting coefficient $Wc^{-\gamma}$, which is a value equal to the white clip level on gamma correction. It is noted that, if the luminance signals Y' after high luminance compression exceeds the above setting coefficient $Wx^{-\gamma}$, the saturation becomes equal to zero. The processing up to this is the same as that of the above-mentioned third system. It is noted that chromaticity compression of maintaining the luminance and the color hue will be explained in detail subsequently.

The luminance compression circuit 116 also compresses the saturation of the portion of the three prime color signals R", G" and B" following the chromaticity compression of maintaining the luminance and the color hue which is luminance-compressed in accordance with the above-mentioned third system. Meanwhile, the start point of luminance compression need not be coincident with that of saturation compression.

In order to do this, output signals of the first saturation compression circuits 160R, 160G and 160B, that is three prime color signals R", G" and B", are sent to associated second saturation compression circuits 163R, 163G and 163B, respectively.

To a third coefficient processor 162 are sent the above-mentioned maximum value namY' from the maximum value detection circuit 157, the value kp and the pre-set setting coefficient c from a terminal 161 (value specifying a point exceeding the value of the above setting coefficient $Wc^{-\gamma}$). Using these, the third coefficient processor 162 executed processing of $$k''=(c-namY')/(c-kp)$$

where $0 \leq k'' \leq 1$ and $c \geq Wc^{-\gamma}$
in order to find the third coefficient k".

It is noted that k" is the first-order equation of namY' and is equal to 1 or 0 if namY'=Kp or namY'=c, respectively.

The third coefficient k", as found by the third coefficient processor 162, is sent to the second saturation compression circuits 163R, 163G and 163B fed with the three prime color signals R", G" and B". These second saturation compression circuits 163R, 163G and 163B are also fed with the luminance signals Y' from the high luminance compression circuit 154. Using these signals, the second saturation compression circuits 163R, 163G and 163B execute saturation compression which maintain luminance and color hue by $$R^*=Y'+k''(R''-Y')$$

$$G^*=Y'+k''(G''-Y')$$

$$B^*=Y'+k''(B''-Y').$$

It is noted that R*, G* and B* denote three prime color signals following saturation compression which maintain the luminance and color hue. These signals R*, G* and B* are outputted at terminals 164R, 164G and 164B and thence sent to the gamma correction circuits 117R, 117G and 117B of FIG. 6.

It is also noted that saturation compression which maintains the luminance and color hue is such compression in which the third coefficient k' is equal to 1 or 0 if the above-mentioned maximum value namY' is the value of the above-mentioned coefficient Kp or if the maximum value namY' exceeds a certain point c exceeding the above-mentioned setting coefficient $Wc^{-\gamma}$. Meanwhile, k" between Kp and c is a first-order equation of namY'.

Figure 8:
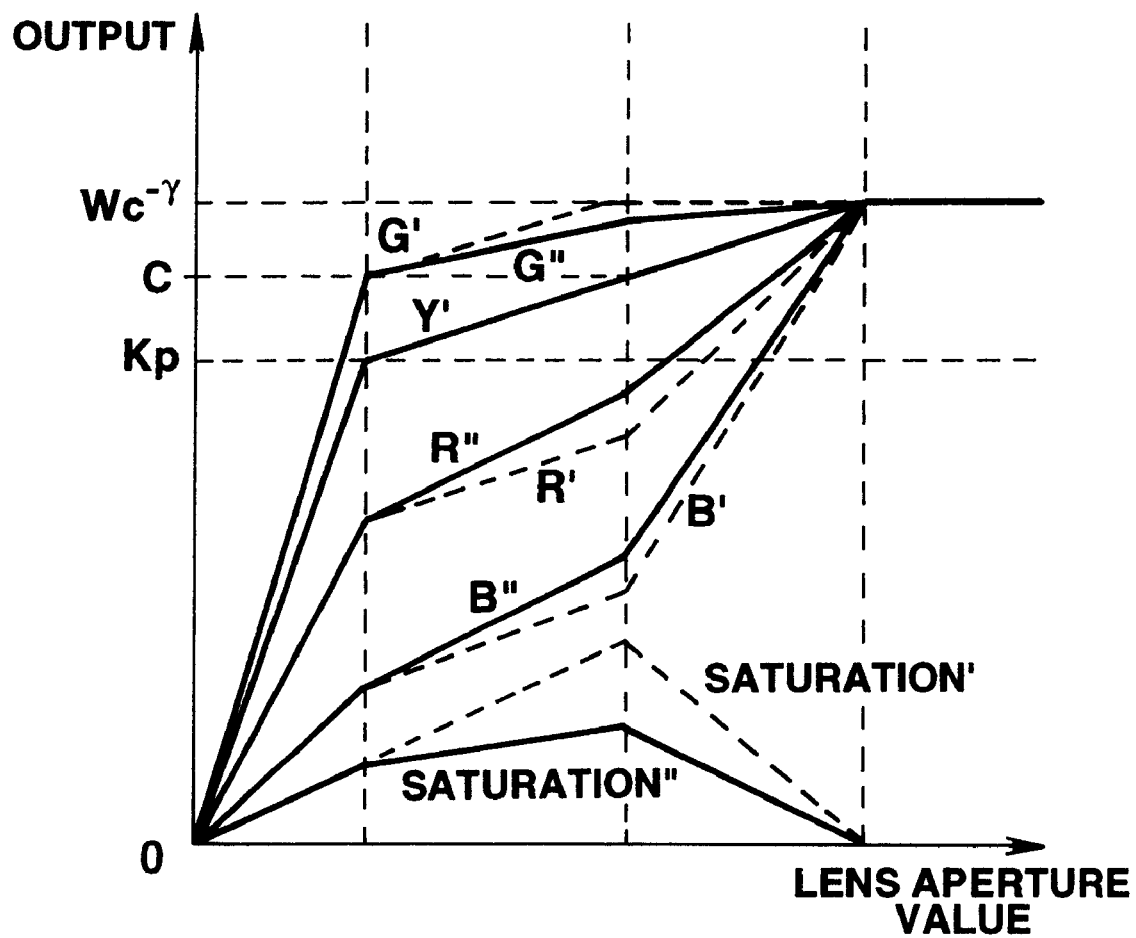
FIG. 8 illustrates the manner in which it has become possible to decrease the saturation of the high luminance portion by the luminance compression circuit shown in FIG. 7.

By the above processing, it becomes possible with the present luminance compression circuit 116 to decrease saturation of the high luminosity portion shown in FIG. 8. In FIG. 8, the abscissa and the ordinate denote the value of a lens stop usually provided in an image pickup lens 141 and the output signal level, respectively.

The above-mentioned coefficient k' can be modified to $$k'=\{c/(c-Kp)\}-\{1/(c-Kp)\} \times namY'$$

in which the terms of $\{c/(c-Kp)\}$ and $\{1/(c-Kp)\}$ are merely coefficients and hence can be pre-set in the circuitry. This simplifies the circuit because there is no necessity of performing division by the divider 155 in the luminance compression circuit 116.

The above-mentioned luminance signals Y' may also be used in place of the maximum value namY' to give approximately the same results.

The circuit may also be simplified if the circuit for compressing only the saturation in such area of white clipping so that the color hue or the luminance is not changed by white clipping.

Figure 9:
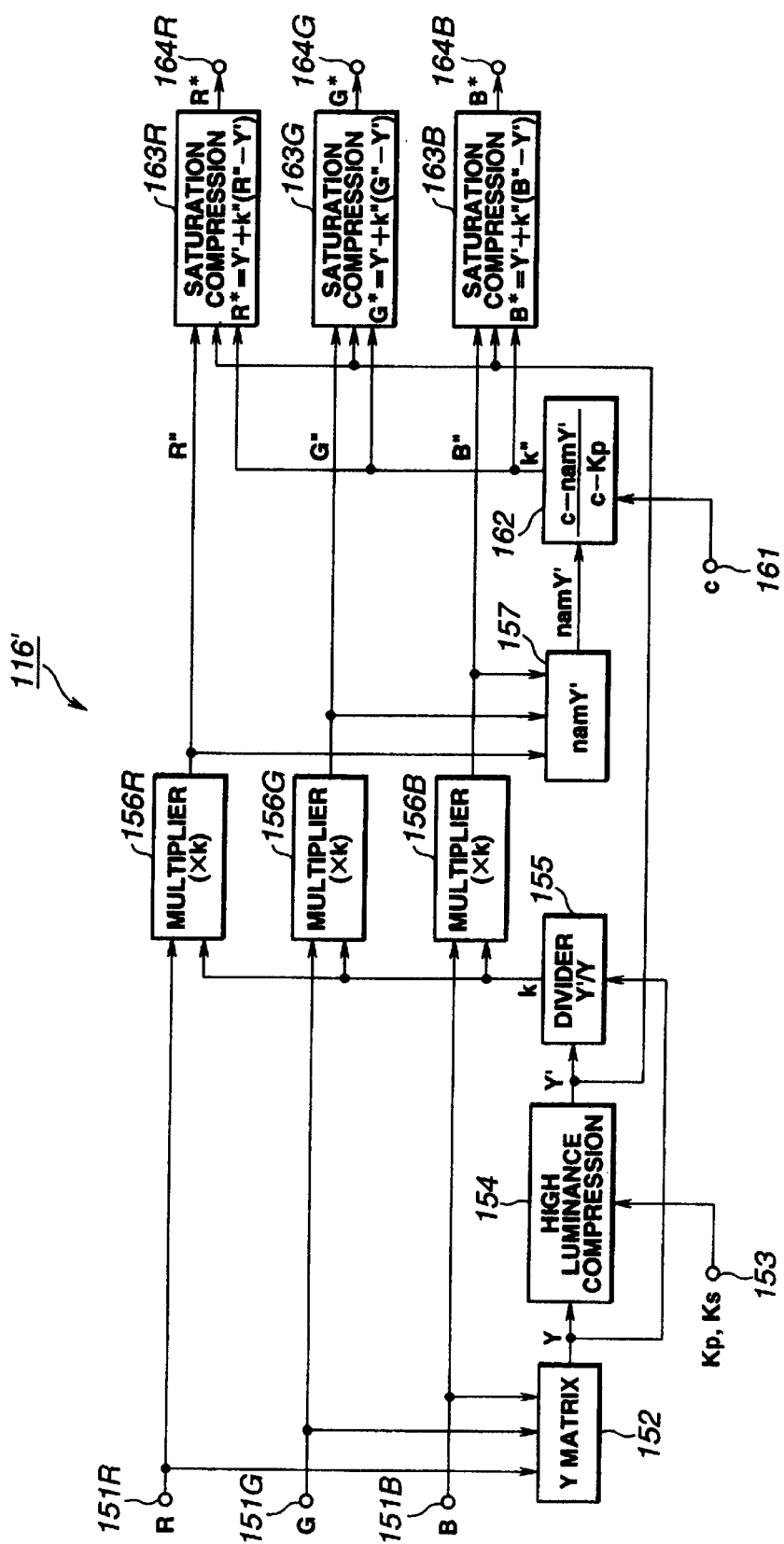
FIG. 9 is a block circuit diagram showing another illustrative structure of the luminance compression circuit.

FIG. 9 shows an illustrative structure of a simplified luminance compression circuit of the simplified type. In a luminance compression circuit 116', shown in FIG. 9, the component parts operating similarly to the luminance compression circuit 116 shown in FIG. 7 are denoted by the same reference numerals and are not explained specifically.

In the luminance compression circuit 116', shown in FIG. 9, signals of respective color components from the multipliers 156R, 156G and 156B are sent as the above-mentioned three prime color signals R", G" and B" to the associated second saturation compression circuits 163R, 163G and 163B and to the maximum value detection circuit 157.

The maximum value namY', as found by the maximum value detection circuit 157, is sent to the third coefficient processor 162, which is fed with the above-mentioned maximum value namY', coefficient Kp and a predetermined setting coefficient c (value denoting a certain point exceeding the setting coefficient $Wc^{-\gamma}$) from the terminal 161, as in the case of the luminance compression circuit 116 of FIG. 7.

The third coefficient k", as found by the third coefficient processor 162, is sent o the second saturation compression circuits 163R, 163G and 163B fed with the three prime color signals R", G" and B". Using the luminance signals Y' from the high luminance compression circuit 154 and the coefficient k", the second saturation compression circuits 163R, 163G and 163B effectuate saturation compression of maintaining luminance and color hue, as described above, in order to find the three prime color signals R*, G* and B*, respectively.

These three prime color signals R*, G* and B* are outputted at terminals 164R, 164G and 164B and thence supplied to the gamma correction circuits 117R, 117G and 117B of FIG. 6.

Thus, in the luminance compression circuit 116', shown in FIG. 9, the color hue preserving effect at the white clip is lost. However, a simplified structure is realized.

Moreover, the above-mentioned coefficient can be varied within the range of $Wc^{-\gamma} \leq c \leq \infty$ to control the effect of saturation compression. For example, the effect of saturation compression in the present invention is minimum for $c=\infty$ in a manner equivalent for the third system as used alone. Conversely, the effect of saturation compression is maximum if $c=Wc^{-\gamma}$. That is, the effect of saturation compression can be freely changed by controlling the setting value of the coefficient c. Such variation of the effect of saturation compression is helpful in adjusting the picture quality during imaging.

Figure 10:
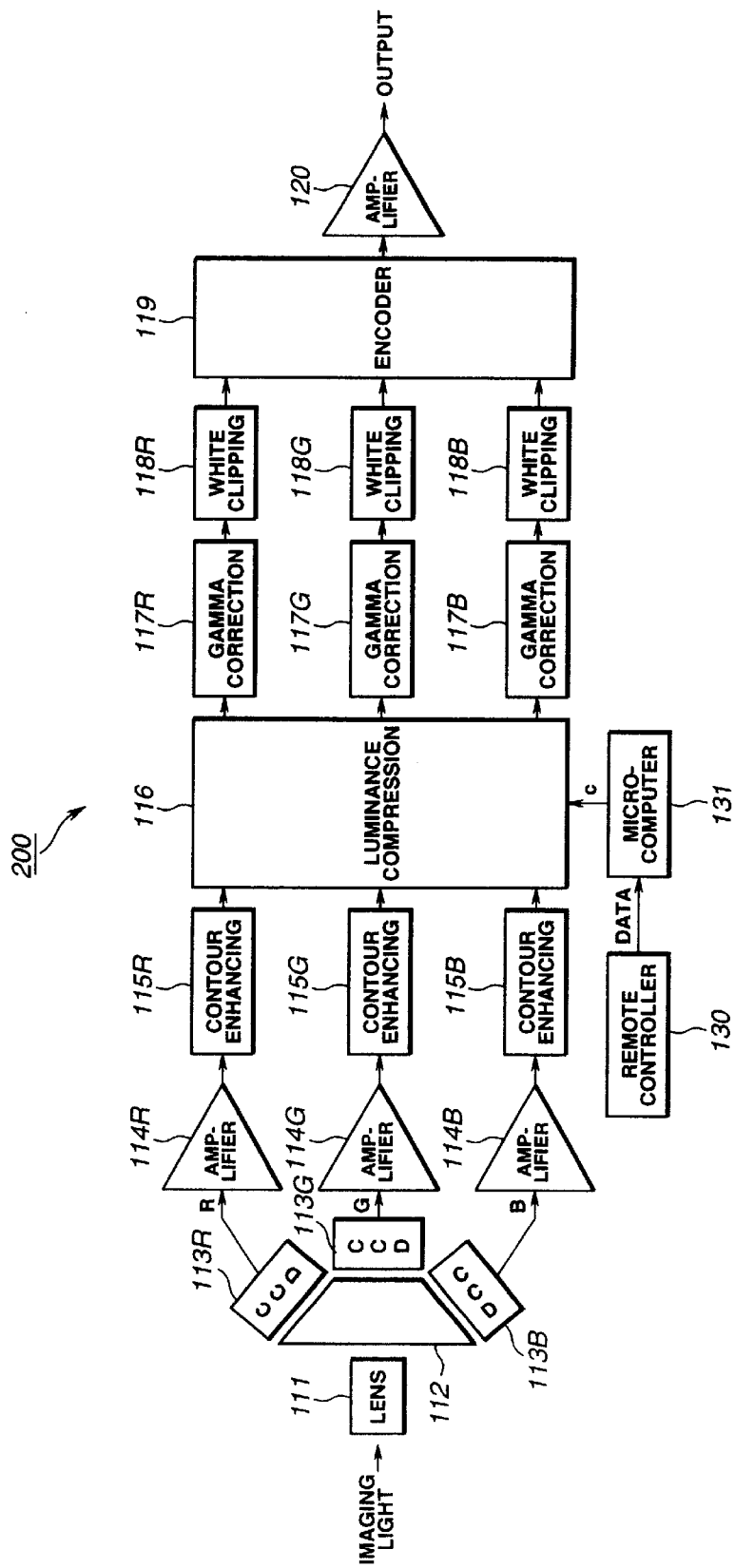
FIG. 10 is a schematic block circuit diagram showing a color video camera having a luminance compression circuit the coefficient c of which is controlled from outside.

The arrangement for controlling the coefficient c may be that of a color video camera 200 shown in FIG. 10. The color video camera 200 shown in FIG. 10 refers to an example of controlling the coefficient c from outside. Meanwhile, in the color video camera 200 shown in FIG. 10, the components operating similarly to those of the color video camera 100 shown in FIG. 6 are denoted by the same reference marks and hence the corresponding description is omitted for simplicity. The luminance compression circuit 116 in the color video camera 200 in FIG. 10 has a structure shown in FIGS. 7 or 9 and the coefficient c is sent to the terminal 161.

In FIG. 10, a remote controller 130 is used for commanding control of the coefficient c by a cameraman actuating a video camera 200 or by an operator actuating the video camera 200 from a place remote from this video camera. Input data from the remote controller 130 are entered to a micro-computer 131. The micro-computer 131 is responsive to input data from the remote controller 130 to generate the coefficient c which is sent to the luminance compression circuit 116.

The principle of compression in the axes of luminance, color hue and brightness explained in the above embodiments is hereinafter explained.

In the compression in the axes of luminance, color hue and brightness, 1. processing of converting only luminance without affecting color hue nor saturation, that is the aforementioned luminance compression which maintains the saturation and the color hue; and
2. processing of converting only saturation without affecting luminance nor saturation, that is the aforementioned saturation compression which maintains the luminance and the color hue are made possible by the following processing operations:

that is, in case of processing of converting only luminance without affecting color hue nor saturation, that is the aforementioned luminance compression which maintains the saturation and the color hue, the three signals R, G and B are multiplied with a common coefficient $k_w$, as indicated by the equation (1):

$$\begin{bmatrix} R' \\ G' \\ B' \end{bmatrix} = k_w \begin{bmatrix} R \\ G \\ B \end{bmatrix} \quad (1)$$

In the following description, the following description is made in generic terms for distinction from the aforementioned embodiments. The relation with these embodiments will be explained whenever the necessity arises. If the equation (1) is made to correspond to the embodiment of FIG. 7, the coefficient $k_w$ corresponds to the coefficient k, while R, G and B correspond to the three prime color signals R, G and B from the terminals 151R, 151G and 151B and R', G' and B' in the equation (1) correspond to the three prime color signals R', G' and B' outputted by the multipliers 156R, 156G and 156B.

Next, in case of processing of converting only saturation without affecting luminance nor color hue, that is the aforementioned luminance compression which maintains the luminance and the color hue, linear processing operations specified by the following equation (2) is executed:

$$\begin{bmatrix} R' \\ G' \\ B' \end{bmatrix} = \begin{bmatrix} 0.30+0.70k_c & 0.59(1-k_c) & 0.11(1-k_c) \\ 0.30(1-k_c) & 0.59+0.41k_c & 0.11(1-k_c) \\ 0.30(1-k_c) & 0.59(1-k_c) & 0.11+0.89k_c \end{bmatrix} \begin{bmatrix} R \\ G \\ B \end{bmatrix} \quad (2)$$

If the equation (2) is made to correspond to the embodiment of FIG. 7, the coefficient $k_c$ in the equation (2) corresponds to the coefficient k', while R, G and B correspond to the three prime colors R', G' and B' outputted by the multipliers 156R, 156G and 156B, respectively, and R', G' and B' correspond to the three prime color signals R", G" and B" outputted by the first saturation compression circuits 160R, 160G and 160B, respectively.

If, for generic explanation in distinction from the luminance signals Y or Y' in the above embodiments, the luminance is represented by W, the above equation (2) can be written as $$R'=W+k_c(R-W) \quad (3)$$

$$G'=W+k_c(G-W) \quad (4)$$

$$B'=W+k_c(B-W) \quad (5)$$

$$W=0.30R+0.59G+0.11B \quad (6)$$

If the description is to be made in association with the embodiment of FIG. 7, the luminance W is equivalent to the luminance signal Y' compressed by high luminance compression by the high luminance compression circuit 154.

The above processing operations are now demonstrated.

For stimulus values (R, G, B) obtained on imaging, the luminance W is given by $$W=0.30R+0.59G+0.11B \quad (7)$$

while the color signals Cx, Cy are given by $$Cx=(R-W)/W \quad (8)$$

$$Cy=(B-W)/W \quad (9)$$

Of these signals (W, Cx, Cy), W is the luminance component compatible with monochromatic television signals, while Cx, Cy have only the color information independently of luminance. If Cx=Cy=0, the pixel is colorless gray pixel. The vector angle of (Cx, Cy) represents the color hue, while the vector magnitude represents saturation.

The variation in case of modifying luminance by the conversion by the equation (1) is scrutinized. By substituting the equation (1) into the equations (7), (8) and (9), we obtain the following equations (10) to (12):

$$\begin{aligned} W' &= k_W(0.30\,R+0.59\,G+0.11\,B) \\ &= k_W W \end{aligned} \quad (10)$$

$$\begin{aligned} Cx' &= (R'-W')/W' \\ &= k_W(R-W)/k_W W \\ &= (R-W)/W \\ &= Cx \end{aligned} \quad (11)$$

$$\begin{aligned} Cy' &= (B'-W')/W' \\ &= k_W(B-W)/k_W W \\ &= B-W/W \\ &= Cy \end{aligned} \quad (12)$$

Thus, it may be seen that only luminance is modified by being multiplied by $k_w$, with the color not being affected whatsoever.

Next, variation by the conversion by the above equations is scrutinized. Substituting the equations (3), (4) and (5) into the equation (7), (8) and (9), we obtain:

$$W' = 0.30\{W + k_c(R-W)\} + 0.59\{W + k_c(G-W)\} + 0.11\{W + k_c(B-W)\} \quad (13)$$
$$= W$$

$$Cx' = (R' - W')/W' \quad (14)$$
$$= \{W + k_c(R-W) - W\}/W$$
$$= k_c(R-W)/W$$
$$= k_c Cy$$

$$Cx' = (B' - W')/W' \quad (15)$$
$$= \{W + k_c(B-W) - W\}/W$$
$$= k_c(B-W)/W$$
$$= k_c Cy.$$

Thus, it may be seen that the magnitudes of (Cx, Cy), that is saturation, is modified by being multiplied by $_{Kc}$, with the luminance not being changed.

Figure 11:
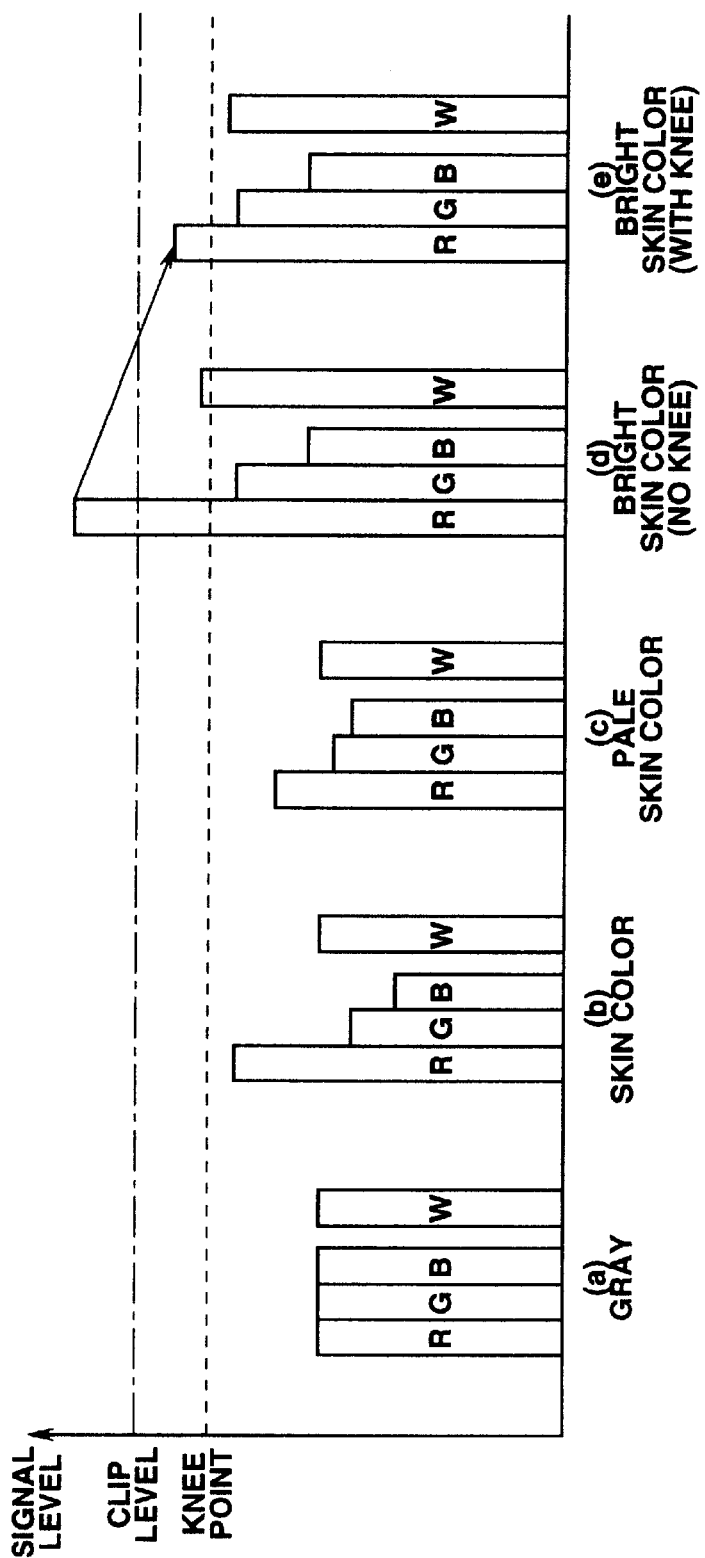
FIG. 11 is a diagram showing the relation between the signal level of the three prime color signals R, G and B and the color.

Referring to FIG. 11, the relation between the signal levels R, G and B and the color is explained based on signals prior to processing with non-linear processing, such as gamma processing.

FIG. 11a shows an example of a signal level on imaging a colorless object. If an image is colorless, R:G:B=1:1:1. In such case, the signal level of each of the channels R, G and B is equal to luminance W and, from the equation (6), R=G=B=W.

As for the signal level on imagine a colored object, R, G and B are distributed about luminance W with certain expanse. In case of a skin color, for example, this expanse is as shown in FIG. 11b. As may be seen from the fact that the equation (6) represents a linear sum of R, G and B by positive coefficients with the sum total being unity, signal level distribution is such that at least one of the R, G and B channels is larger than the luminance W and at least one of the R, G and B channels is smaller than luminance W.

If the saturation is halved, that is if the color is thinned by half, as the color hue is maintained, the signal level distribution of R, G and B is as shown in FIG. 11c. If the color is flier thinned out gradually, the signal levels of the respective channels are converged to luminance W.

If the lens stop is further opened from the state shown in FIG. 11b, the signal level distribution of R, G and B is as shown in FIG. 11d. In this case, there is no change caused in the color hue or saturation, even althougth the luminance is increased. In FIG. 11d, the signal level of the R channel exceeds not only the knee point but also the clip level, such that the signals levels are not in meeting with the television signal standard and hence some level compression is needed.

In the conventional camera system, this constraint is met by applying knee compression from channel to channel, as shown in FIG. 11e. In this manner, the signal level is caused to conform to the television signal standard. However, if the R, G and B balance is checked, it is seen that the signal balance has evidently been changed from that shown in FIG. 11d. This variation affects the color hue, that is, if the picture is viewed, the skin color becomes yellowish, such that, if a face of a person is imaged, the imaged person will appear ill.

Thus, in the aforementioned third system, this excessive channel signal level is processed so as to be comprised in the extent of the signal standard by the following two step operations.

Figure 12:
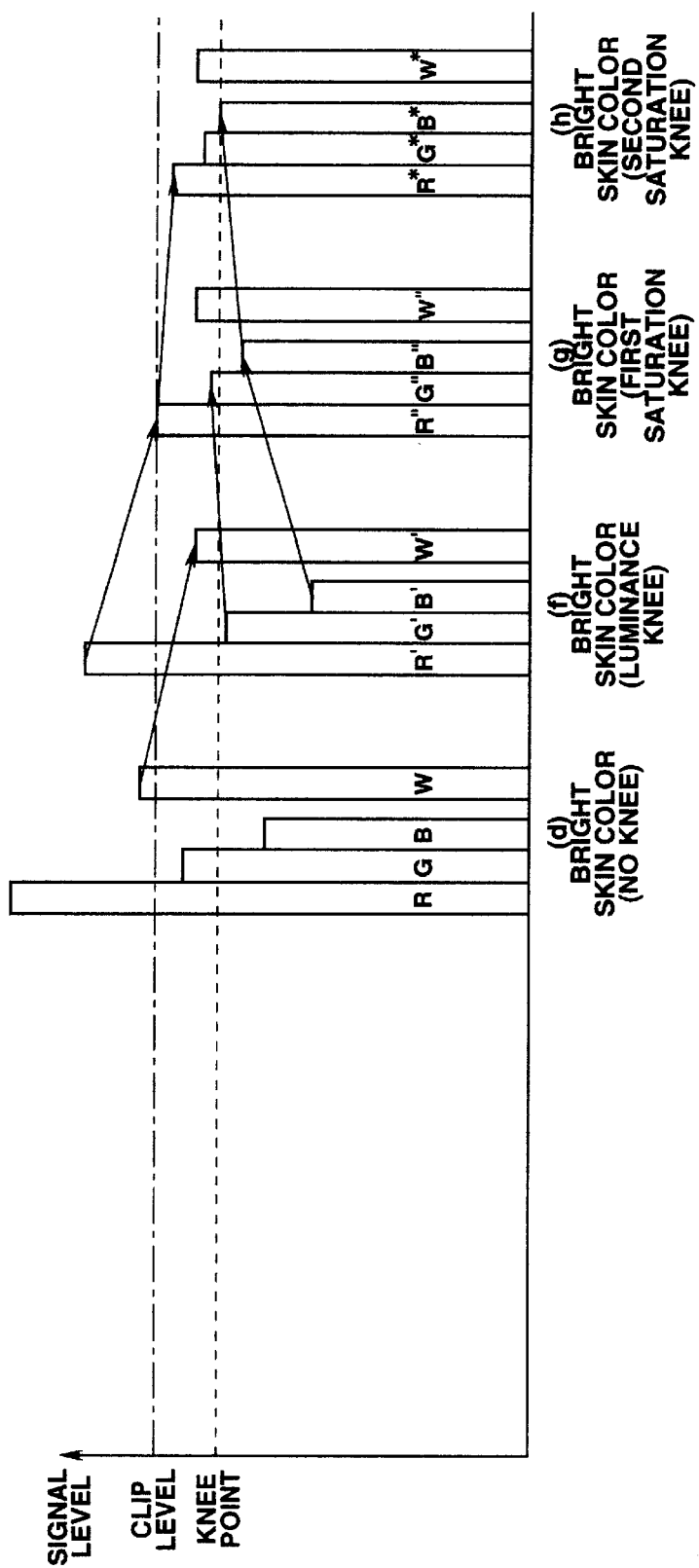
FIG. 12 is a diagram for illustrating the relation between the signal level of the three prime color signals R, G and B and the color in case of performing three-stage step knee compression of the luminance knee, the first saturation knee and second saturation knee.

Specifically, the luminance signal level is compressed, that is the knee compression for the luminance signal level is first made and, if a channel is yet of excessive signal level, saturation is reduced until the channel of the high signal level will be comprised within the standard. The firstly stated compression is hereinafter termed luminance knee. The second knee compression is the compression for saturation and is hereinafter termed first saturation knee. Finally, knee compression for decreasing the saturation of the high luminance portion is performed. This knee compression is hereinafter termed the second saturation knee. This is shown in FIG. 12.

Specifically, the following processing is used.

First, in luminance knee, the luminance level of the input signal shown in FIG. 12d is compressed by knee compression, based on the equation (1), as shown in FIG. 12f. The coefficient (gain) $k_w$ is uniquely determined from the input luminance signal level if once a knee curve is set.

If the knee compression with a tilt of 0° is taken as clipping, it is clear that white clipping can similarly be performed on luminance.

In the first saturation knee, saturation compression is carried out so that, based on the luminance W1 as converted by the luminance knee (corresponding to the luminance signals Y' of FIG. 7), the largest channel signal level in FIG. 12g will be decreased to the clip level by the processing of the equation (2). The coefficient $_{Kc}$ (gain) of saturation appearing in the equation (2) can be calculated by $$k_c = (CM - W_1)/(MAX(R1, G1, B1) - W_1) \quad (16)$$

from the limit value of the signal level of each channel CM (equivalent to the setting coefficient value Wc$^{-\gamma}$ of FIG. 7 and the signal level. MAX)R1, G1, B1 of the channel of the largest signal level corresponding to namY' of FIG. 7.

Further, in the second saturation knee of FIG. 12h, the high luminance portion of the signal level of each channel converted by the first saturation knee is further compressed on the basis of the luminance signals $W_1$ (corresponding to the luminance signals Y" of FIG. 7) in a state of maintaining the luminance and the color hue, as shown in FIG. 12h.

By the above luminance knee, first saturation knee and the second saturation knee, the proposition of compressing the high luminance portion without exceeding the signal level of each channel without varying the color hue can be met, as shown in FIG. 12h.

Next, in the highlight portion of a picture, it can be colored by forcibly increasing the chroma signal level. This system of forcibly increasing the chroma signal level trespasses television signal standard in the strict sense of the term because the R, G and B signals demodulated in a television receiver exceed a predetermined dynamic range. However, it is used since it has an attractive merit of coloring the high luminance portion and it scarcely raises practical inconvenience.

Figure 13:
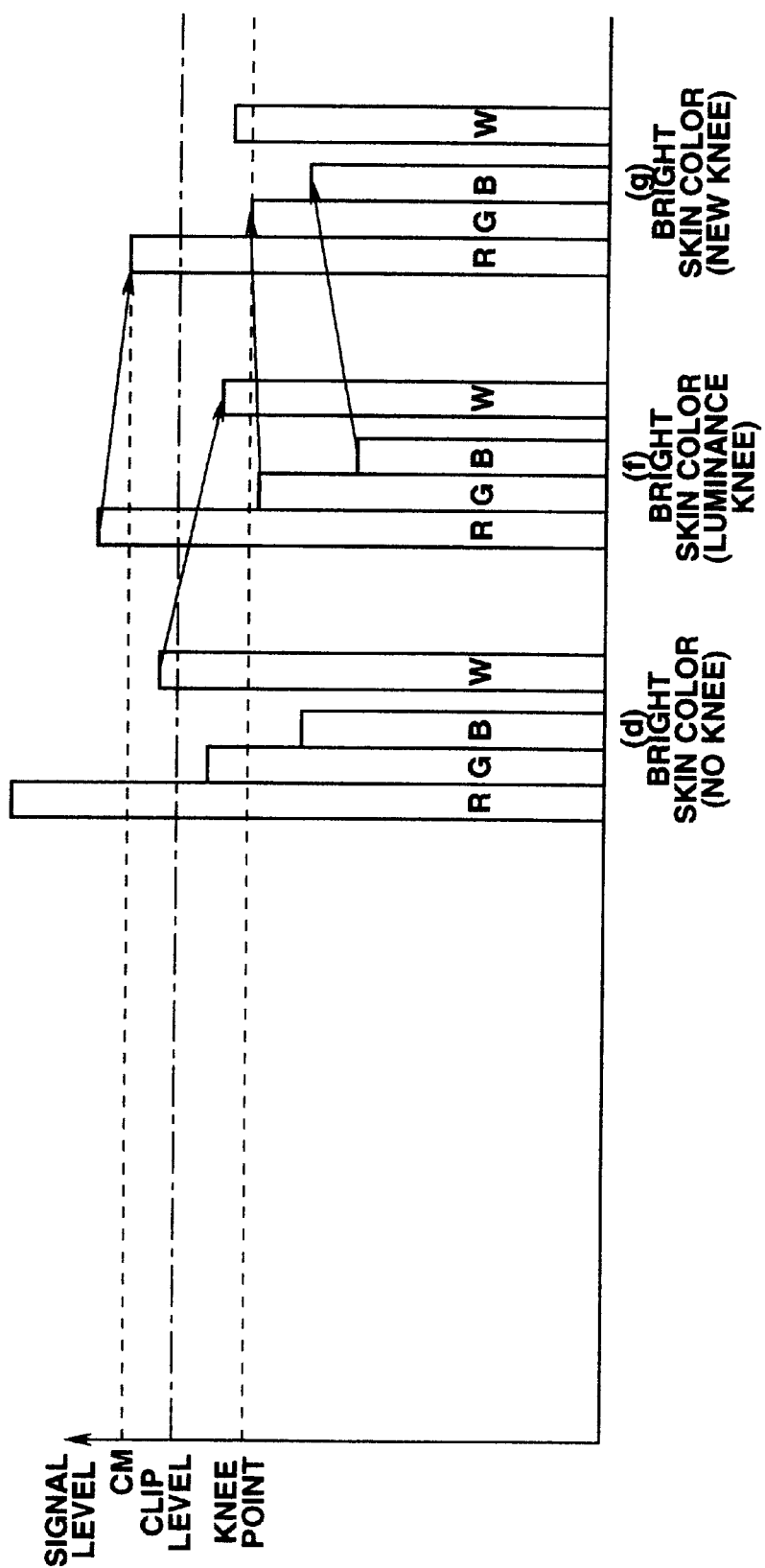
FIG. 13 is a diagram for illustrating the relation between the signal level of the three prime color signals R, G and B and the color in case of coloring even the highlighted portion.

Here, the limit value CM of the equation (16) is set to 110% or higher in order to suppress the luminance W to 110% or less and to allow for the three prime color signals R, G and B exceeding the signal level within the limit value CM as an upper threshold value. In such case, the color hue can be maintained, while saturation is automatically adjusted so that the saturation will be as faithful to the original image as possible within the given range. The state of preforming this processing is shown in FIG. 13, from which it is seen that, by moderating the signal level limitation to the signal level CM with luminance limitation remaining unchanged, the high luminance area can be colored extensively.

From the foregoing it is seen that, in accordance with the present invention, only saturation of the high luminance portion can be varied according to the liking of the viewer to realize more spontaneous luminance compression by compressing only luminance of the high luminance portion with the color hue and the saturation unaltered and by compressing only saturation with the luminance of the high luminance portion and the color hue unchanged.

What is claimed is:

1. A picture signal processing apparatus comprising:

first control signal generating means for receiving three prime color input signals and for generating a first control signal in accordance with a signal level of the one of the three received prime color input signals having the highest signal level;

second control signal generating means for receiving the three prime color input signals and for generating a second control signal in accordance with the signal level of the one of said three received prime color input signals having the highest signal level;

first saturation compression means for compressing only color saturation of color image signals represented by said three prime color input signals in response to said first control signal so that, in a state in which color hue and luminance of said color image signals are maintained, the signal level of the one of said three prime color signals having the highest signal level is at a predetermined signal level; and second saturation compression means for compressing only color saturation of the compressed color image signals, compressed in saturation by said first saturation compression means, in a state in which the luminance and the color hue are maintained, in response to said second control signal.

2. The picture signal processing apparatus according to claim 1, further comprising:

luminance compression means for compressing the signal levels of the three prime color input signals at a same compression ratio in a state in which the color hue and the saturation of the color image signals represented by the three prime color input signals are maintained to send resulting signals to said first saturation compression means.

3. The picture signal processing apparatus according to claim 2 wherein said first and second saturation compression means effectuate saturation compression based on a luminance signal level of color video signals from said luminance compression means.

4. The picture signal processing apparatus according to claim 2 further comprising:

control means for variably setting a range of saturation compression by said second saturation compression means.

5. A color video camera comprising:

image pickup means for generating three-color input signals from imaging light;

first control signal generating means for generating a first control signal, said first control signal generating means receiving the three-color input signals, determining a maximum signal level of the received three-color input signals, and generating said first control signal in accordance with the determined signal level;

second control signal generating means for generating a second control signal, said second control signal generating means receiving the three-color input signals, determining the maximum signal level, and generating said second control signal in accordance with the determined signal level;

first saturation compression means for receiving said three-color input signals and compressing only color saturation of color image signals represented by the three-color input signals generated by said image pickup means in response to said first control signal so that the maximum signal level is a predetermined signal level, in a state in which color hue and saturation of said color image signals are maintained; and second saturation compression means for compressing only color saturation of compressed color image signals, at least compressed in saturation by said first saturation compression means, in a state in which luminance and color hue thereof are maintained, in response to said second control signal.

6. The color video camera according to claim 5, further comprising:

luminance compression means for compressing signal levels of the color video signals represented by the three color input signals generated by said image pickup means with a same compression ratio for the three color input signals, in a state in which the color hue and the saturation of the color video signals are maintained, and for supplying the compressed signal levels to said first saturation compression means.

7. The color video camera according to claim 6 wherein said first and second saturation compression means effectuate saturation compression based on a luminance signal level of the color video signals from by said luminance compression means.

8. The color video camera according to claim 6 further comprising:

control means for variably setting a range of saturation compression by said second saturation compression means.

9. A method for processing picture signals comprising:

a first control signal generating step of receiving three prime color input signals and generating a first control signal in accordance with a signal level of the one of three prime color input signals having the highest signal level;

a second control signal generating step of receiving the three prime color input signals and generating a second control signal based on the signal level of the one of said three prime color signals having the highest signal level;

a first saturation compression step for compressing only color saturation of color image signals represented by said three prime color input signals in response to said first control signal so that, in a state in which color hue and luminance of said color image signals are maintained, the signal level of the one of said three prime color input signals having the highest signal level is at a predetermined signal level; and a second saturation compression step of compressing only color saturation of the compressed color image signals, compressed in saturation by said first saturation compression step, in a state in which the luminance and the color hue are maintained, in response to said second control signal.

10. The picture signal processing method according to claim 9, further comprising:

a luminance compression step of compressing signal levels of the three prime color input signals at a same compression ratio for the three prime color input signals, in a state which the color hue and the saturation of the color image signals represented by the three prime color input signals are maintained, to send resulting signals to said first saturation compression means, said luminance compression step being provided ahead of said first saturation compression step.

11. A picture signal processing apparatus comprising:

control signal generating means for generating a control signal, said control signal generating means receiving three prime color signals, determining a signal level of the one of the three prime color signals having the highest signal level, and generating the control signal according to the signal level of the one of the three prime color signals having the highest signal level, first coefficient having a predetermined value and second coefficient relating to a signal level of luminance of the three prime color; and saturation compression means for compressing, only when the signal level of the luminance of the three prime color signals exceeds said second coefficient, only saturation of the three prime color signals in a state in which the luminance and the color hue are maintained, in response to said control signal, wherein said control signal is equal to the difference between the first coefficient and the signal level of the one of the three prime color signals having the highest signal level divided by the difference between the first coefficient and the second coefficient.

12. The picture signal processing apparatus according to claim 11 further comprising:

luminance compression means for compressing the signal levels of three prime color input signals at a same compression ratio in a state in which the color hue and the saturation of the color image signals represented by the three prime color input signals are maintained to send resulting signals to said saturation compression means.

13. The picture signal processing apparatus according to claim 11 wherein said saturation compression means comprises saturation compression circuits.

14. The picture signal processing apparatus according to claim 11 wherein said second coefficient has a variable value.

15. A picture signal processing method comprising the steps of:

receiving three prime color signals;

determining a signal level of one of the three prime color signals having the highest signal level;

generating a control signal according to the signal level of one of the three prime color signals having the highest signal level, first coefficient having a predetermined value and second coefficient relating to a signal level of luminance of the three prime color signals; and compressing, only when the signal level of the luminance of the three prime color signals exceeds said second coefficient, only saturation of the three prime color signals in a state in which the luminance and the color hue are maintained, in response to said control signal, wherein said control signal is equal to the difference between the first coefficient and the signal level of the one of the three prime color signals having the highest signal level divided by the difference between the first coefficient and the second coefficient.

16. The picture signal processing apparatus according to claim 11 further comprising:

compressing the signal levels of three prime color input signals at a same compression ratio in a state in which the color hue and the saturation of the color image signals represented by the three prime color input signals are maintained to send resulting signals to said saturation compression means.

17. The picture signal processing apparatus according to claim 15 wherein said second coefficient has a variable value.

18. A video camera having a picture signal processing apparatus comprising:

control signal generating means for generating a control signal, said control signal generating means receiving three prime color signals, determining a signal level of the one of the three prime color signals having the highest signal level, and generating the control signal according to the signal level of the one of the three prime color signals having the highest signal level, first coefficient having a predetermined value and second coefficient relating to a signal level of luminance of the three prime color signals; and saturation compression means for compressing, only when the signal level of the luminance of the three prime color signals exceeds said second coefficient, only saturation of the three prime color signals in a state in which the luminance and the color hue are maintained, in response to said control signal, wherein said control signal is equal to the difference between the first coefficient and the signal level of the one of the three prime color signals having the highest signal level divided by the difference between the first coefficient and the second coefficient.

19. The video camera according to claim 18 further comprising:

luminance compression means for compressing the signal levels of three prime color input signals at a same compression ratio in a state in which the color hue and the saturation of the color image signals represented by the three prime color input signals are maintained to send resulting signals to said saturation compression means.

20. The video camera according to claim 18 wherein said saturation compression means comprises saturation compression circuits.

21. The video camera according to claim 18 wherein said second coefficient has a variable value.

* * * * *